United States Patent
Zhang et al.

(10) Patent No.: US 9,371,917 B2
(45) Date of Patent: Jun. 21, 2016

(54) FUEL CONDITIONING SYSTEM

(71) Applicant: General Electric Company, Schenectady, NY (US)

(72) Inventors: Hua Zhang, Greer, SC (US); Douglas Scott Byrd, Greer, SC (US); Iris Ziqin Hu, Greer, SC (US); Dean Matthew Erickson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 13/873,269

(22) Filed: Apr. 30, 2013

(65) Prior Publication Data

US 2014/0318634 A1    Oct. 30, 2014

(51) Int. Cl.
| | |
|---|---|
| F02C 7/224 | (2006.01) |
| F16K 5/06 | (2006.01) |
| G05D 16/00 | (2006.01) |
| F02C 3/22 | (2006.01) |
| F02C 7/232 | (2006.01) |
| F02C 9/26 | (2006.01) |

(52) U.S. Cl.
CPC ... *F16K 5/06* (2013.01); *F02C 3/22* (2013.01); *F02C 7/224* (2013.01); *F02C 7/232* (2013.01); *F02C 9/263* (2013.01); *G05D 16/00* (2013.01); *Y10T 137/0379* (2015.04); *Y10T 137/6416* (2015.04)

(58) Field of Classification Search
CPC .......... F02C 7/047; F02C 7/224; F02C 7/232
USPC ............. 60/39.093, 39.1; 251/208; 137/625.3
See application file for complete search history.

(56) References Cited

U.S. PATENT DOCUMENTS

| | | | |
|---|---|---|---|
| 4,472,621 A * | 9/1984 | Blackmore | F16L 53/004 137/341 |
| 4,782,658 A | 11/1988 | Perry | |
| 5,816,280 A | 10/1998 | Rojey et al. | |
| 6,168,768 B1 * | 1/2001 | Alexion et al. | 423/210 |
| 6,315,969 B1 * | 11/2001 | Yoshida | 423/239.1 |
| 6,394,134 B1 * | 5/2002 | Kwon | F16K 47/08 137/625.3 |
| 6,688,324 B2 | 2/2004 | Hoang et al. | |
| 6,913,042 B2 * | 7/2005 | Tran | 137/625.3 |
| 7,134,284 B2 | 11/2006 | Lohn | |
| 7,348,451 B2 | 3/2008 | Dahlmann et al. | |
| 7,920,970 B2 | 4/2011 | Zuo et al. | |
| 8,034,748 B2 | 10/2011 | Dahlmann et al. | |
| 8,141,843 B2 | 3/2012 | Rimboym et al. | |
| 8,191,646 B2 | 6/2012 | Kinnari et al. | |
| 8,366,070 B2 | 2/2013 | Rimboym et al. | |

(Continued)

OTHER PUBLICATIONS

Dresser, Title "QTCV-T4 Quiet Trim Control Valve Superior Performance Ball Control Valves for Natural Gas Applications", 2010, pp. 1-16.

(Continued)

*Primary Examiner* — Kevin Murphy
(74) *Attorney, Agent, or Firm* — Sutherland Asbill & Brennan LLP

(57) ABSTRACT

The present application provides a fuel conditioning system for delivering a flow of fuel to a nozzle in a gas turbine engine. The fuel conditioning system may include a fuel compressor to increase the pressure of the flow of fuel, a pressure reduction valve to decrease the pressure of the flow of fuel, and a heater downstream of the pressure reduction valve. The pressure reduction valve may include a rotary control valve.

18 Claims, 2 Drawing Sheets

(56) References Cited

U.S. PATENT DOCUMENTS

| | | | |
|---|---|---|---|
| 2003/0056514 A1* | 3/2003 | Lohn | 60/734 |
| 2007/0012358 A1* | 1/2007 | Brautsch et al. | 137/6 |
| 2010/0162708 A1 | 7/2010 | Erickson et al. | |
| 2011/0023491 A1* | 2/2011 | Rendo et al. | 60/734 |
| 2011/0056212 A1* | 3/2011 | Zhang et al. | 60/786 |
| 2011/0130941 A1* | 6/2011 | Szepek et al. | 701/100 |
| 2011/0203291 A1* | 8/2011 | Erickson et al. | 60/776 |
| 2012/0006433 A1* | 1/2012 | Morgan | 137/597 |
| 2012/0078021 A1 | 3/2012 | Durham et al. | |
| 2012/0145939 A1 | 6/2012 | Rimboym et al. | |

OTHER PUBLICATIONS

Dresser, Title: "Products, Instrumentation and Accessories", 2010, pp. 1-12.

* cited by examiner

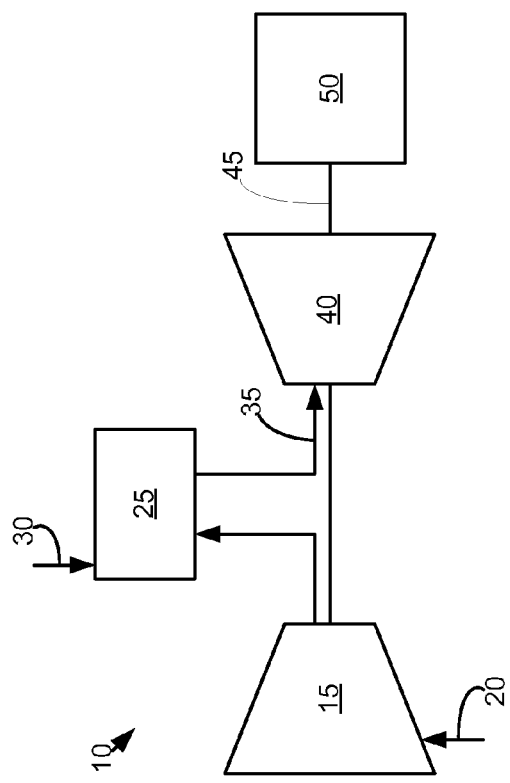
Fig. 1
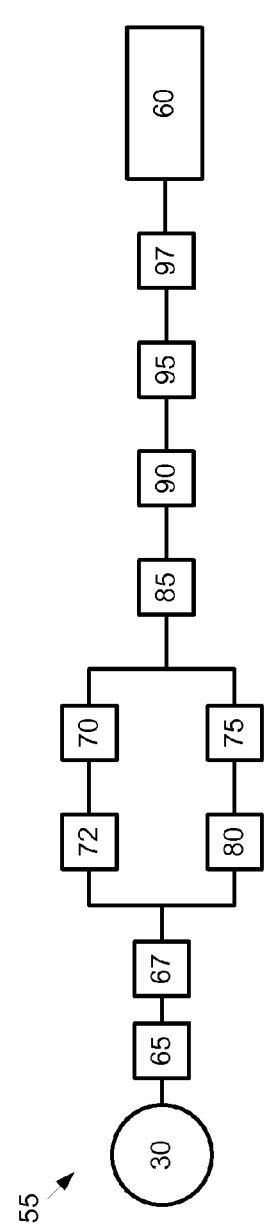
Fig. 2 -Prior Art-

FUEL CONDITIONING SYSTEM

TECHNICAL FIELD

The present application and the resultant patent relate generally to gas turbine engines and more particularly relate to a fuel conditioning system that limits icing and hydrate formation in a pressure reduction valve and downstream thereof without the use of upstream heating devices.

BACKGROUND OF THE INVENTION

Generally described, a fuel conditioning system for a heavy duty gas turbine provides a flow of fuel to a fuel nozzle at a substantially constant pressure. If, for example, a natural gas supply pressure is too high, the fuel conditioning system needs to reduce the pressure before the flow of fuel reaches the nozzle. Such a reduction in pressure, however, may cause ice and hydrate formation in the flow of fuel due to the Joule-Thompson effect as well as local low pressure created by certain types of pressure control valves. Hydrates in the flow of fuel may cause nozzle erosion, flashback, and other types of combustion issues. Moreover, ice buildup could make a conventional pressure control valve inoperable. Ice buildup and hydrates inside the fuel conditioning system thus may be detrimental to the operation of the gas turbine power plant as a whole.

Known methods for reducing ice and hydrate formation include using water bath heaters and the like upstream of the pressure reduction valve. Such water bath heaters may include a natural gas boiler to heat the water supply. The use of such a water bath heater may be effective in maintain the temperature of the flow of fuel, but the water bath heater may be relatively expensive to operate. Moreover, operation of the natural gas boiler may require an emissions permit.

There is thus a desire for an improved fuel conditioning system for a gas turbine engine. Preferably such a system may deliver a flow of fuel at a substantially constant pressure to the nozzle without the use of water bath heaters or other types of parasitic loads while preventing ice and hydrate formation therein.

SUMMARY OF THE INVENTION

The present application and the resultant patent thus provide a fuel conditioning system for delivering a flow of fuel to a nozzle in a gas turbine engine. The fuel conditioning system may include a fuel compressor to increase the pressure of the flow of fuel, a pressure reduction valve to decrease the pressure of the flow of fuel, and a heater downstream of the pressure reduction valve. The pressure reduction valve may include a rotary control valve.

The present application and the resultant patent further provide a method of delivering a flow of fuel to a nozzle in a gas turbine engine. The method may include the steps of sensing temperature and pressure of the flow of fuel, flowing the fuel to a pressure reduction valve to decrease the pressure therein, and heating the flow of fuel downstream of the pressure reduction valve. The step of flowing the fuel to a pressure reduction valve may include flowing the fuel across a number of plates to reduce the pressure therein.

The present application and the resultant patent further provide a fuel conditioning system for delivering a flow of fuel to a nozzle in a gas turbine engine. The fuel conditioning system may include a pressure reduction valve to decrease the pressure of the flow of fuel, and one or more heat tracing elements positioned downstream of the pressure reduction valve. The pressure reduction valve may include a rotary control valve with a throttling ball therein.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 1 is a schematic diagram of a gas turbine engine showing a compressor, a combustor, and a turbine.

FIG. 2 is a schematic diagram of a known fuel conditioning system for use with a gas turbine engine.

DETAILED DESCRIPTION

Figure 3:
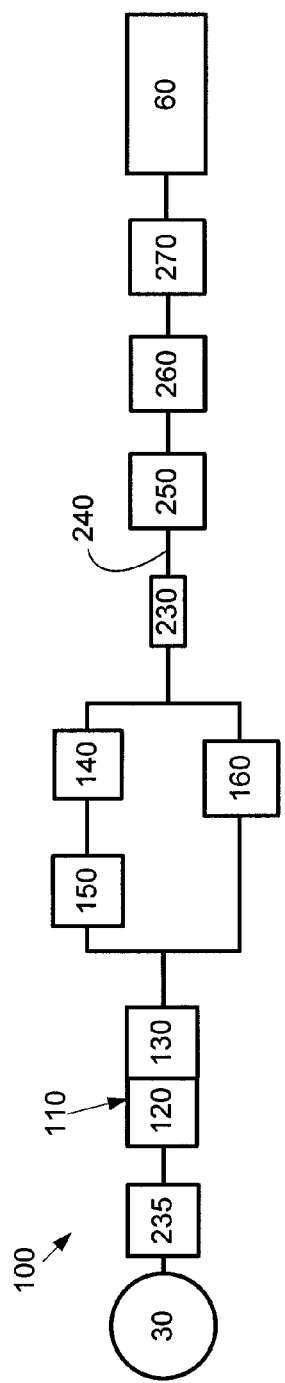
FIG. 3 is a schematic diagram of a fuel conditioning system as may be described herein.

Referring now to the drawings, in which like numerals refer to like elements throughout the several views, FIG. 1 shows a schematic diagram of a gas turbine engine 10 as may be described herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, various types of liquid fuels, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

FIG. 2 shows a schematic diagram of an example of a known fuel conditioning system 55 that may be used with the gas turbine engine 10 and elsewhere. Specifically, the fuel conditioning system 55 may provide the flow of fuel 30 to one or more of the nozzles 60 of the combustor 25. The fuel conditioning system 55 will be described herein by way of example only. Many other components and many other configurations may be used. Different types of fuels also may be used.

Generally described, the fuel conditioning system 55 may include a knockout drum 65 in communication with the incoming flow of fuel 30. The knockout drum 65 may be any type of conventional liquid-gas separator. The knockout drum 65 may begin the process of removing moisture from the flow of fuel 30. A fine filter 67 or a demister also may be used for further screening. The fine filter 67 also may be of conventional design.

If the pressure of the flow of fuel 30 is to be increased, the flow of fuel 30 may be sent to a fuel compressor 70. The fuel compressor 70 may increase the pressure of the flow of fuel 30 to suitable level. A compressor filter 72 also may be used to filter the flow. The compressor 70 and the compressor filter 72 may be of conventional design. If the pressure flow of fuel 30 is to be reduced, the flow of fuel 30 may be sent to a pressure reduction valve 75. The pressure reduction valve 75 may decrease the pressure of the flow of fuel 30 to a suitable level. The pressure reduction valve 75 may be of conventional design. As described above, because reducing the pressure of flow of fuel 30 may cause ice and hydrate formation due to the Joule-Thompson affect and local low pressure, a water bath heater 80 may be used upstream of the pressure reduction valve 75. The water bath heater 80 may be a natural gas boiler and the like. The water bath heater 80 may heat the flow of fuel 30 by about fifty degrees Fahrenheit (about ten degrees Celsius) or so over the dew point of the fuel in order to prevent downstream icing and hydrate formation. Other temperatures may be used herein. Other types of upstream heating methods also may be used.

After either the fuel compressor 70 or the pressure reduction valve 75, the flow of fuel 30 may flow through a coalescing filter 85. The coalescing filter 85 may be of conventional design. The coalescing filter 85 may further eliminate mist and/or particulates from the flow of fuel 30. The flow of fuel 30 then may be heated in a performance heater 90. The performance heater 90 generally warms the flow of fuel 30 with waste heat or heat from another source in a heat exchange arrangement and the like. The fuel conditioning system 55 also may include a startup heater 95. The startup heater 95 may be powered by an auxiliary or parasitic power source. The startup heater 95 generally may be used until the performance heater 90 is operational. The fuel conditioning system 55 also may include a scrubber 97 so as to remove any further moisture before entry into the nozzle 60 of the combustor 25. Other components and other configurations may be used herein.

FIG. 3 shows an example of a fuel conditioning system 100 as may be described herein. The fuel conditioning system 100 may condition the flow of fuel 30 for use in the nozzle 60 of the combustor 25 and the like. Different types of fuels may be used herein.

The fuel conditioning system 100 may include a combined knockout drum/filter 110 in communication with the incoming flow of fuel 30. The combined knockout drum/filter 110 may include a knockout drum 120 and an attached fine filter or demister 130 similar to that described above. The combined knockout drum/filter 110 begins to remove moisture and the like from the flow of fuel 30. If the pressure of the flow of fuel is to be increased, the flow of fuel 30 may be delivered to a fuel compressor 140. The fuel compressor 140 may be of conventional design. Likewise, a conventional compressor filter 150 may be used. Other components and other configurations may be used herein.

Figure 4:
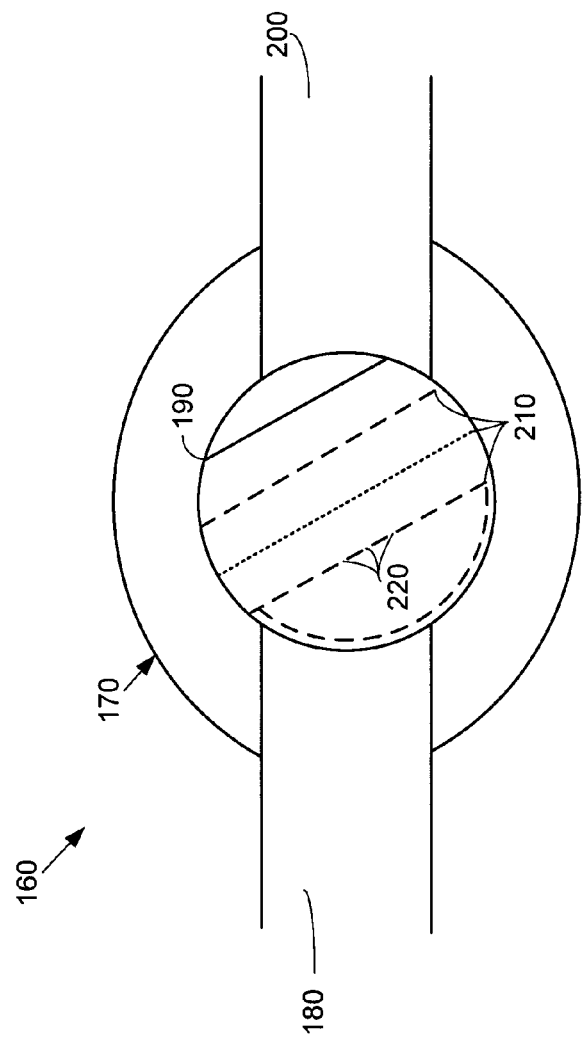
FIG. 4 is a schematic diagram of a rotary control valve that may be used with the fuel conditioning system of FIG. 3.

If the pressure of the flow of fuel 30 is to be reduced, the flow of fuel 30 may flow to a pressure reduction valve 160. In this example, the pressure reduction valve 160 may be a rotary control valve 170. As is shown in FIG. 4, the rotary control valve 170 may include an inlet 180, a throttling ball 190, and an outlet 200. The throttling ball 190 may include a number of internal plates 210 with perforations 220 therethrough. The plates 210 with the perforations 220 therethrough may maximize frictional resistance so as to provide a pressure reduction across each plate 210. The perforations 220 may be configured to produce a steady flow pattern therethrough. The rotary control valve 170 thus reduces the pressure and the velocity of the flow of fuel 30 therein. Moreover, the rotary control valve 170 creates the pressure drop but does not create a flow path where hydrates can build up so as to cause the valve to become inoperable. The throttling ball 190 therein may rotate to vary the pressure differential thereacross. An example of a suitable rotary control valve 170 is sold by Dresser, Inc. of Elk Grove Village, Illinois under the designation "Becker QTCV-T4 Quiet Trim Control Valve" and the like. Such rotary control valves also are described in U.S. Pat. Nos. 8,366,072 B2 and 8,141,843 B2.

The rotary control valve 170 also may have one or more filters or sweeping features so as to prevent particulate buildup therein. The rotary control valve 170 thus may be substantially self-cleaning. The use of the coalescing filter 85 and the like thus may not be required downstream of the rotary control valve 170 given the internal self-cleaning features. Other components and other configurations may be used herein.

In order to prevent the buildup of hydrates downstream of the rotary control valve 170, heat tracing elements 230 may be added to a downstream pipeline 240. The heat tracing elements 230 may be of conventional design. The heat tracing elements 230 may be electric and may be externally powered. Use of the heat tracing elements 230, however, may only be required during certain types of operating conditions. Given such, a number of sensors 235 may be used to monitor the pressure, temperature, and a moisture content of the flow of fuel 30 in combination with the ambient temperature. Any number of the sensors 235 may be used herein and may be positioned anywhere along the fuel conditioning system 100. Other types of ambient and operational parameters also may be considered herein.

The use of the heat tracing elements 230 also may not be required if the pipeline 240 is relatively straight with only gradual bends between the rotary control valve 170 and a performance heater 250. The performance heater 250 may be of conventional design. A startup heater 260 also may be used herein. If only a short distance is used, any hydrates that may form downstream of the rotary control valve 170 may vaporize near the performance heater 250. The heat from the performance heater 250 generally may keep the flow of fuel 30 in the pipeline 240 warm. An amount of insulation also may be used about the pipeline 240. A scrubber 270 may be positioned downstream of the performance heater 250 and the startup heater 260. The scrubber 270 may be of conventional design. Other components and other configurations may be used herein.

The fuel conditioning system 100 with the rotary control valve 170 thus provides a pressure reduction in the flow of fuel 30 without icing or the formation of hydrates therein. The rotary control valve 170 does not promote the formation of vortex regions that may create the pressure, temperature, and/or velocity conditions required for hydrate formation. Moreover, downstream hydrate formation may be further limited by the use of the heat tracing elements 230 or simply by positioning the rotary control valve 170 a short distance from the performance heater 250 and the like. The heat tracing elements 230 may be an overall parasitic load, but less so as compared to the operation of the water bath heater and the like. The fuel conditioning system 100 thus provides a cost effective fuel conditioning with fewer subsystems and components as compared to known systems with reduced engineering costs and higher overall efficiency. Overall capital costs and operational costs thus may be reduced herein. Multiple rotary control valves 170 may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel conditioning system for delivering a flow of fuel to a nozzle in a gas turbine engine, comprising:
a combined knockout drum and filter;
a heater;
a first fuel circuit in between the combined knockout drum and filter and the heater;
a second fuel circuit parallel to the first fuel circuit extending from the combined knockout drum and filter to the heater;
a fuel compressor to increase the pressure of the flow of fuel, the fuel compressor positioned at the first fuel circuit;
a pressure reduction valve to decrease the pressure of the flow of fuel, the pressure reduction valve positioned at the second fuel circuit, wherein the pressure reduction valve is positioned at the second fuel circuit, the pressure reduction valve comprising a rotary control valve with a valve filter; and
a compressor filter upstream of the compressor and downstream of the combined knockout drum and filter, wherein the compressor filter is positioned to filter fuel entering the fuel compressor;
wherein the combined knockout drum and filter is in direct communication with the pressure reduction valve and is positioned upstream of the fuel compressor and upstream of the pressure reduction valve; and
the heater is downstream of the pressure reduction valve in direct communication with the fuel compressor and the pressure reduction valve, such that fuel from the first fuel circuit and the second fuel circuit flows directly to the heater.

2. The fuel conditioning system of claim 1, wherein the rotary control valve comprises a throttling ball therein.

3. The fuel conditioning system of claim 2, wherein the throttling ball comprises a plurality of plates with a plurality of perforations therein.

4. The fuel conditioning system of claim 2, wherein the throttling ball comprises a rotating ball.

5. The fuel conditioning system of claim 1, wherein the heater comprises a performance heater.

6. The fuel conditioning system of claim 1, wherein the heater comprises a startup heater.

7. The fuel conditioning system of claim 1, wherein the heater comprises one or more heat tracing elements in direct communication with the pressure reduction valve, and a performance heater in direct communication with the heat tracing elements.

8. The fuel conditioning system of claim 1, further comprising a scrubber positioned downstream of the pressure reduction valve.

9. The fuel conditioning system of claim 1, further comprising a straight pipeline downstream of the pressure reduction valve.

10. The fuel conditioning system of claim 1, further comprising one or more sensors therein.

11. The fuel conditioning system of claim 10, wherein the one or more sensors comprise a fuel pressure sensor, a fuel temperature sensor, a fuel moisture content sensor, or an ambient temperature sensor.

12. The fuel conditioning system of claim 1, further comprising a single nozzle downstream of the fuel compressor and downstream of the pressure reduction valve.

13. The fuel conditioning system of claim 1, wherein the fuel conditioning system does not comprise a filter downstream of the heater.

14. A method of delivering a flow of fuel to a nozzle in a gas turbine engine, comprising:
sensing temperature and pressure of the flow of fuel;
flowing the fuel through a combined knockout drum and filter to a pressure reduction valve to decrease the pressure therein, wherein the combined knockout drum and filter is in direct communication with the pressure reduction valve and is positioned upstream of the pressure reduction valve, and the pressure reduction valve is between the combined knockout drum and a heater;
flowing the fuel through a parallel fuel circuit having a fuel compressor in communication with the heater;
filtering the fuel through a valve filter at the pressure reduction valve;
wherein the step of flowing the fuel to a pressure reduction valve comprises flowing the fuel across a plurality of plates to reduce the pressure therein; and
heating the flow of fuel downstream of the pressure reduction valve with the heater that is in direct communication with the pressure reduction valve, such that fuel from the pressure reduction valve and the parallel fuel circuit flows directly to the heater.

15. A fuel conditioning system for delivering a flow of fuel to a nozzle in a gas turbine engine, comprising:
a combined knockout drum and filter;
a heater;
a first fuel circuit in between the combined knockout drum and filter and the heater;
a second fuel circuit parallel to the first fuel circuit extending from the combined knockout drum and filter to the heater;
a pressure reduction valve to decrease the pressure of the flow of fuel, wherein the pressure reduction valve is positioned at the second fuel circuit;
the pressure reduction valve comprising a rotary control valve with a throttling ball therein and a valve filter;
a combined knockout drum and filter in direct communication with the pressure reduction valve, the combined knockout drum and filter positioned upstream of the fuel compressor and upstream of the pressure reduction valve;
a compressor filter upstream of a fuel compressor and downstream of the combined knockout drum and filter, wherein the compressor filter is positioned to only filter fuel entering the fuel compressor; and
one or more heat tracing elements downstream of the pressure reduction valve;
wherein the heater is downstream of the pressure reduction valve in direct communication with the fuel compressor and the pressure reduction valve, such that fuel from the first fuel circuit and the second fuel circuit flows directly to the heater.

16. The fuel conditioning system of claim 15, wherein the throttling ball comprises a plurality of plates with a plurality of perforations therein.

17. The fuel conditioning system of claim 15, further comprising a performance heater downstream of the pressure reduction valve.

18. The fuel conditioning system of claim 15, further comprising a startup heater downstream of the pressure reduction valve.

* * * * *